(12) United States Patent
Chapman et al.

(10) Patent No.: US 7,631,429 B2
(45) Date of Patent: Dec. 15, 2009

(54) HANDHELD PEELER WITH REMOVABLE MULTI-BLADE CARTRIDGE

(75) Inventors: Dean Chapman, Montclair, NJ (US); Paul Goetz, New York, NY (US); Ed Kilduff, New York, NY (US); Gareth Brown, Jersey City, NJ (US)

(73) Assignee: Freshlink Product Development, LLC, New York, NY (US)

( * ) Notice: Subject to any disclaimer, the term of this patent is extended or adjusted under 35 U.S.C. 154(b) by 72 days.

(21) Appl. No.: 11/675,029

(22) Filed: Feb. 14, 2007

(65) Prior Publication Data

US 2007/0186423 A1 Aug. 16, 2007

Related U.S. Application Data

(60) Provisional application No. 60/773,447, filed on Feb. 15, 2006.

(51) Int. Cl.
| | |
|---|---|
| *A01D 1/00* | (2006.01) |
| *B26B 3/00* | (2006.01) |
| *B26B 13/00* | (2006.01) |
| *A23N 7/00* | (2006.01) |
| *A47J 17/00* | (2006.01) |

(52) U.S. Cl. .............. 30/279.6; 30/279.2; 30/278; 99/588

(58) Field of Classification Search ............. 30/279.6, 30/278, 279.2; D7/695; 99/588, 584
See application file for complete search history.

(56) References Cited

U.S. PATENT DOCUMENTS

| 2,252,094 | A | * | 8/1941 | Palmer | 30/279.6 |
|---|---|---|---|---|---|
| 3,124,106 | A | * | 3/1964 | Kosta | 401/78 |
| 3,220,110 | A | * | 11/1965 | Popeil | 30/143 |
| 3,430,341 | A | * | 3/1969 | Choate | 30/40 |
| 4,241,500 | A | * | 12/1980 | Iten | 30/40 |
| 4,592,140 | A | * | 6/1986 | Chasen | 30/123.7 |
| 5,960,545 | A | * | 10/1999 | Shepherd et al. | 30/125 |
| 6,928,908 | B1 | * | 8/2005 | Yu | 81/490 |
| 7,021,181 | B1 | * | 4/2006 | Chi | 81/490 |

* cited by examiner

*Primary Examiner*—Ghassem Alie
*Assistant Examiner*—Bharat C Patel
(74) *Attorney, Agent, or Firm*—White-Welker & Welker LLC

(57) ABSTRACT

A handheld peeler with removable multi-blade holder for peeling, or slicing food products. The tool includes a main handle made from steel or any other suitable tough metal or plastic, a button, a blade cartridge, two or more blades, a top blade holder, a bottom blade holder, an axle, a retaining ring, and a knob.

10 Claims, 13 Drawing Sheets

HANDHELD PEELER WITH REMOVABLE MULTI-BLADE CARTRIDGE

CROSS REFERENCE TO RELATED APPLICATIONS

This application claims priority from U.S. Provisional Patent Application Ser. No. 60/773,447, entitled "Handheld Peeler with Removable Multi-Blade Cartridge", filed on Feb. 15, 2006.

FEDERALLY SPONSORED RESEARCH

Not Applicable

SEQUENCE LISTING OR PROGRAM

Not Applicable

TECHNICAL FIELD OF THE INVENTION

The present invention relates generally to handheld kitchen tools. More specifically, the present invention relates to handheld kitchen tools for peeling, slicing, decorating, and shaving food items such as various fruits and vegetables.

BACKGROUND OF THE INVENTION

Many peelers are known in the prior art and marketplace, virtually all peelers share the same shortcomings with respect to adaptability, repeated use, and safety. For example U.S. Pat. No. 6,671,964 teaches that the majority of peelers in the prior art are comprised of narrow opposing, cutting edges in the peeling element or peeling blades. Such peeling elements are designed for use with thin-skinned fruits such as potatoes, carrots, and apples. The peeler taught by U.S. Pat. No. 6,671,964 specifically claims the use of a peeling element with blades placed at a specific distance apart for use with the cutting of thick-skinned fruits and vegetables such as green bananas or plantains.

The peelers discussed as prior art and the peeler taught by U.S. Pat. No. 6,671,964 both share the same shortcomings in that they either do not have replaceable peeling elements, are only capable of holding one peeling element which may or may not be replaceable, or their peeling elements are exposed and have no means for being retracted during storage.

Therefore, it is an objective of the present invention to teach a handheld peeler with a removable multi-blade cartridge enabling a user to quickly change blades.

It is another objective of the present invention to teach a handheld peeler with a removable multi-blade cartridge that may hold blades of various designs, sizes and shapes.

It is yet another objective of the present invention to teach handheld peeler with a removable multi-blade cartridge that allows the user to retract the peeling element when it is not in use for safe storage or use around children.

SUMMARY OF THE INVENTION

The present invention is a handheld peeler with removable multi-blade cartridge. The tool comprises in combination: a main handle made from steel or any other suitable tough metal or plastic, button assembly, blade cartridge, two or more blades, a top blade holder, bottom blade holder, an axle, a retaining ring, a blade guard, and a knob.

The primary advantage of the present invention is that it provides a device that stores two or more blades within its handle for peeling. The use of multiple blades provides a user with means to quickly change blades when they become worn, or to select from various blade sizes, shapes, and designs.

Another advantage of the present invention is the ability for a user to avoid changing individual blades for use or replacement. The present invention teaches a multi-blade tool using a cartridge system that provides users the ability to simply change cartridges for multi-use peeling or multi-decorative peeling groups of blades.

Still another advantageous aspect of the present invention is the removable multi-blade cartridge that may hold blades of various designs, sizes and shapes. Enabling the use and removal of multiple blades in one cartridge provides for easier cleaning either using dishwasher or by hand.

Yet another advantage of the present invention is the removable multi-blade cartridge that allows the user to retract the peeling element when it is not is use for safe storage or use around children.

TABLE OF NUMERICAL REFERENCES

| | |
|---|---|
| 2. | Handle |
| 4. | Blade guard |
| 6. | Knob |
| 8. | Retaining ring |
| 10. | Cartridge |
| 12. | Axle |
| 14. | Blade (any variety) |
| 16. | Top blade holder |
| 18. | Bottom blade holder |
| 20. | Button |
| 22. | Button spring |
| 24. | Spring loaded pin |
| 26. | Fixing plate |
| 28. | Blade securing pin |
| 30. | Cartridge assembly |
| 32. | Blade assembly (any variety) |
| 34. | Button assembly |
| 38. | Eyeing tip |
| 40. | Rubber/texture grip area |
| 42. | Forward blade rest |
| 44. | Blade opening |
| 46. | Gripping pads |
| 48. | Button Track |
| 50. | Top cartridge guide |
| 52. | Blade locator |
| 54. | Button release slot |
| 56. | Forward blade locking detent |
| 58. | Cartridge rails |
| 60. | Rear blade locking detent |
| 62. | Axle mounting area |
| 64. | Sloped surface |
| 66. | Top blade holder fin |
| 68. | Pin recess |
| 70. | Rear section of blade |
| 72. | Blade securing pin hole |
| 74. | Bottom blade pivot |
| 76. | Bottom blade holder mount |
| 82. | Blade tip |
| 86. | Top blade pivot |
| 88. | Top Blade mount |
| 92. | Blade detent lead in |
| 94. | Blade detent |
| 96. | Top blade guard guide |
| 98. | Blade guard clips |
| 100. | Knob position detent |
| 102. | Water escape opening |
| 104. | Arrow indicator |
| 106. | Bottom blade guard guide |
| 108. | Interior handle rib |

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Referring to the figures, it is possible to see the various major elements constituting the apparatus of the present invention. The present invention is a handheld peeler with removable multi-blade cartridge 10 specifically designed for peeling or slicing food items.

Figure 1:
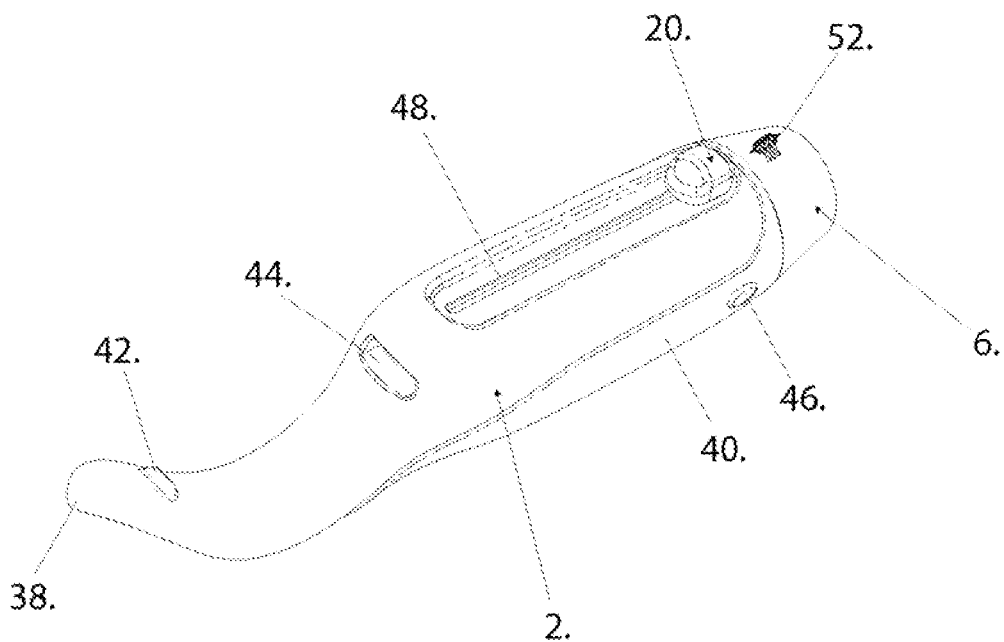
FIG. 1 illustrates the exterior appearance of the peeler of the present invention with the peeling blade retracted.
Figure 2:
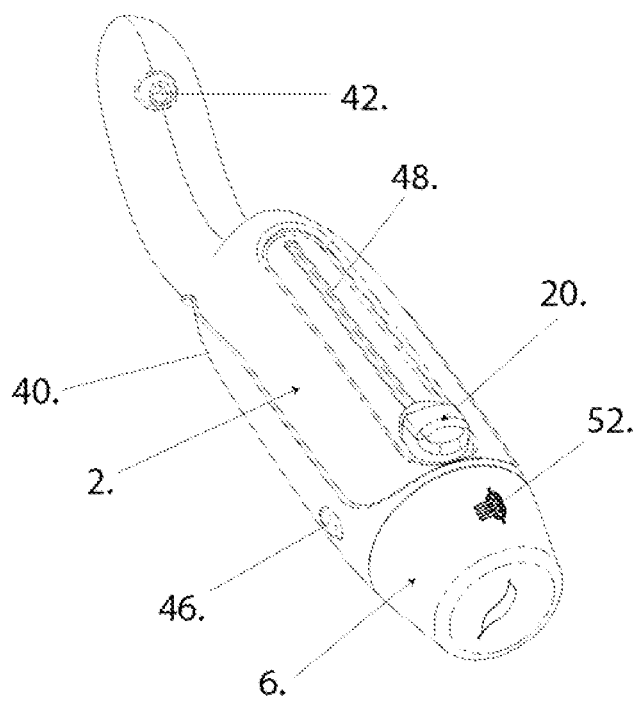
FIG. 2 illustrates the exterior appearance of the peeler of the present invention with the peeling blade retracted.
Figure 3:
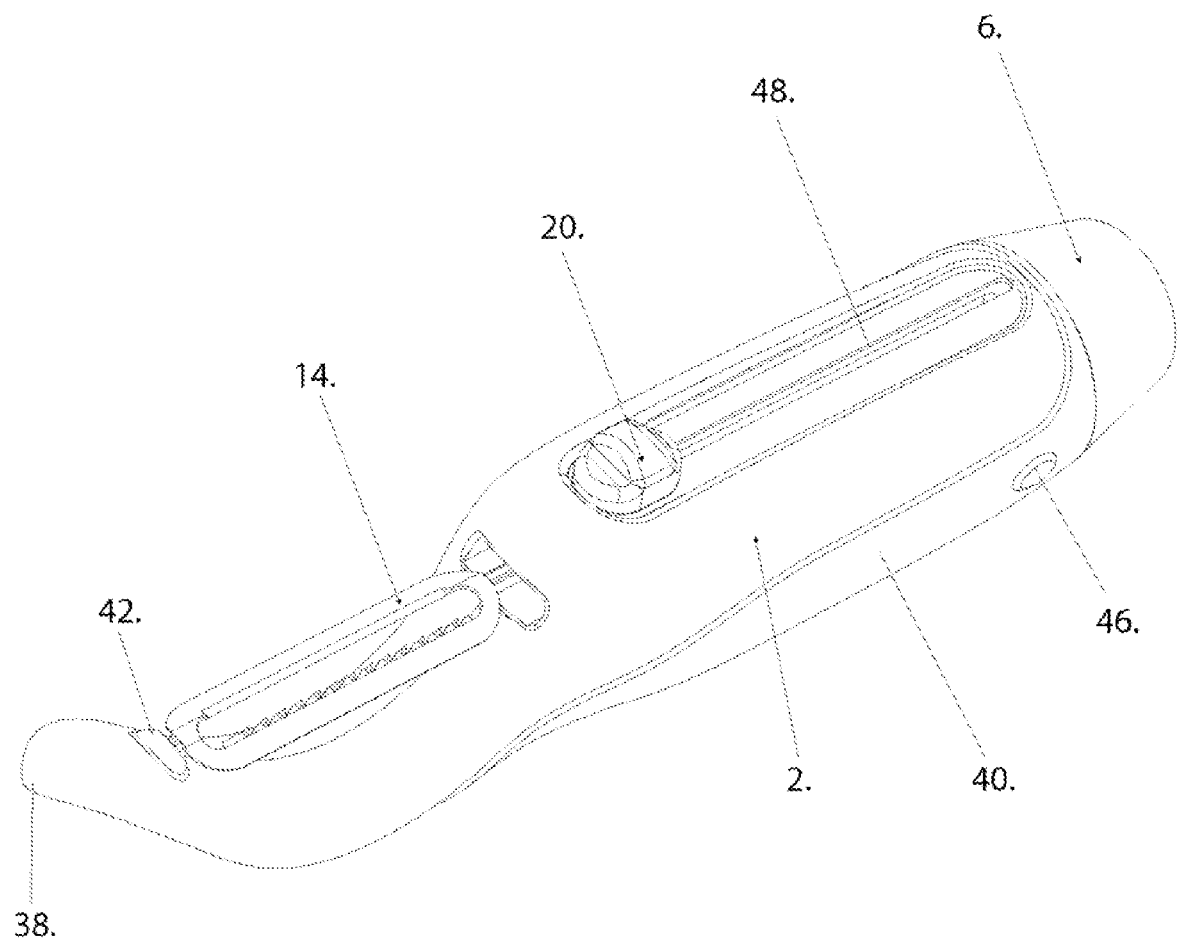
FIG. 3 illustrates the exterior appearance of the peeler of the present invention with a peeling blade extended.
Figure 4:
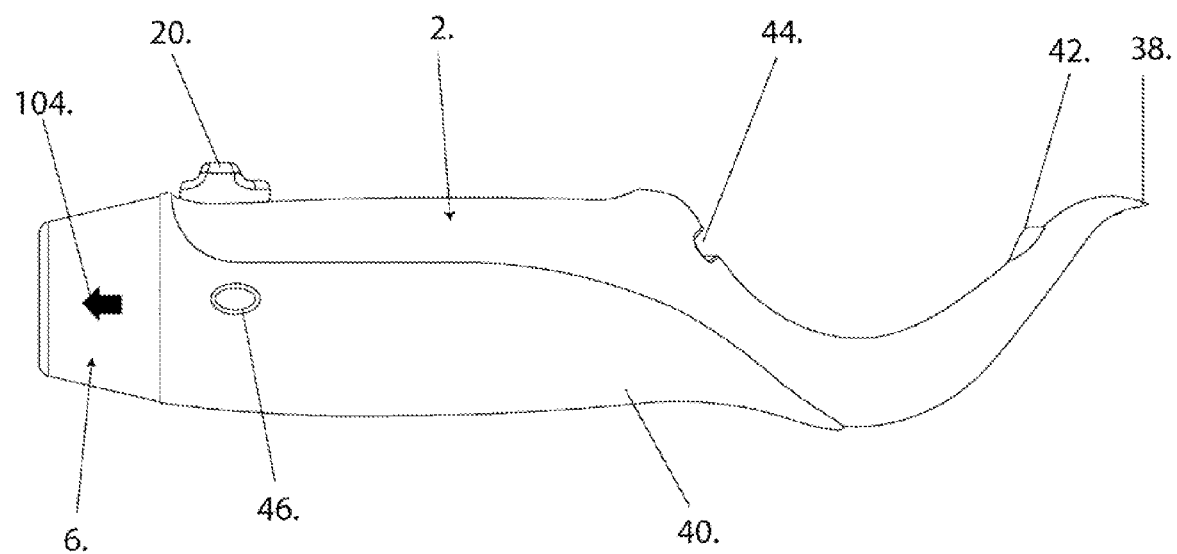
FIG. 4 illustrates the exterior appearance of the peeler of the present invention with a peeling blade retracted as viewed from the side.
Figure 5:
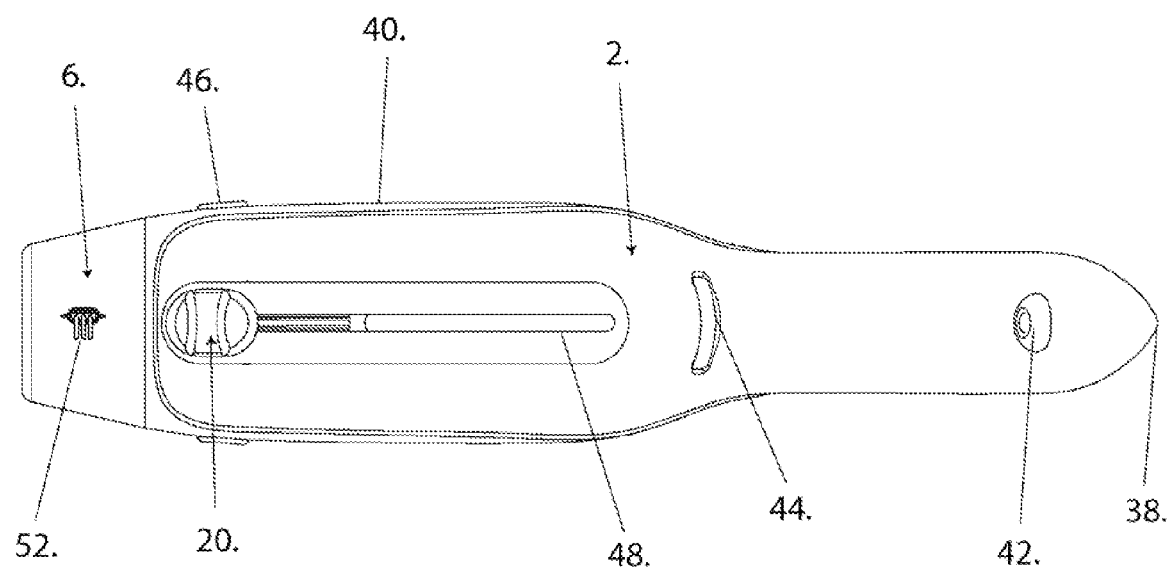
FIG. 5 illustrates the exterior appearance of the peeler of the present invention with the peeling blade retracted as viewed from the top.
Figure 6:
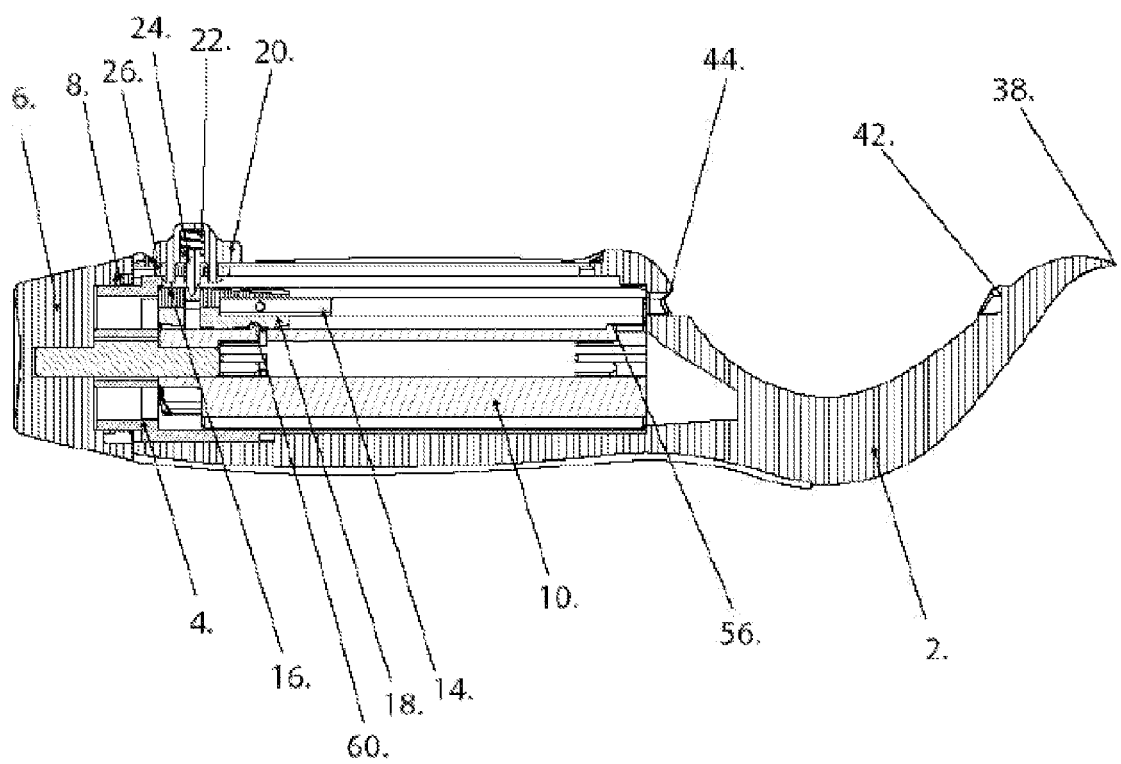
FIG. 6 is a cross sectional views which illustrate the internal mechanisms of the peeler of the present invention.
Figure 7:
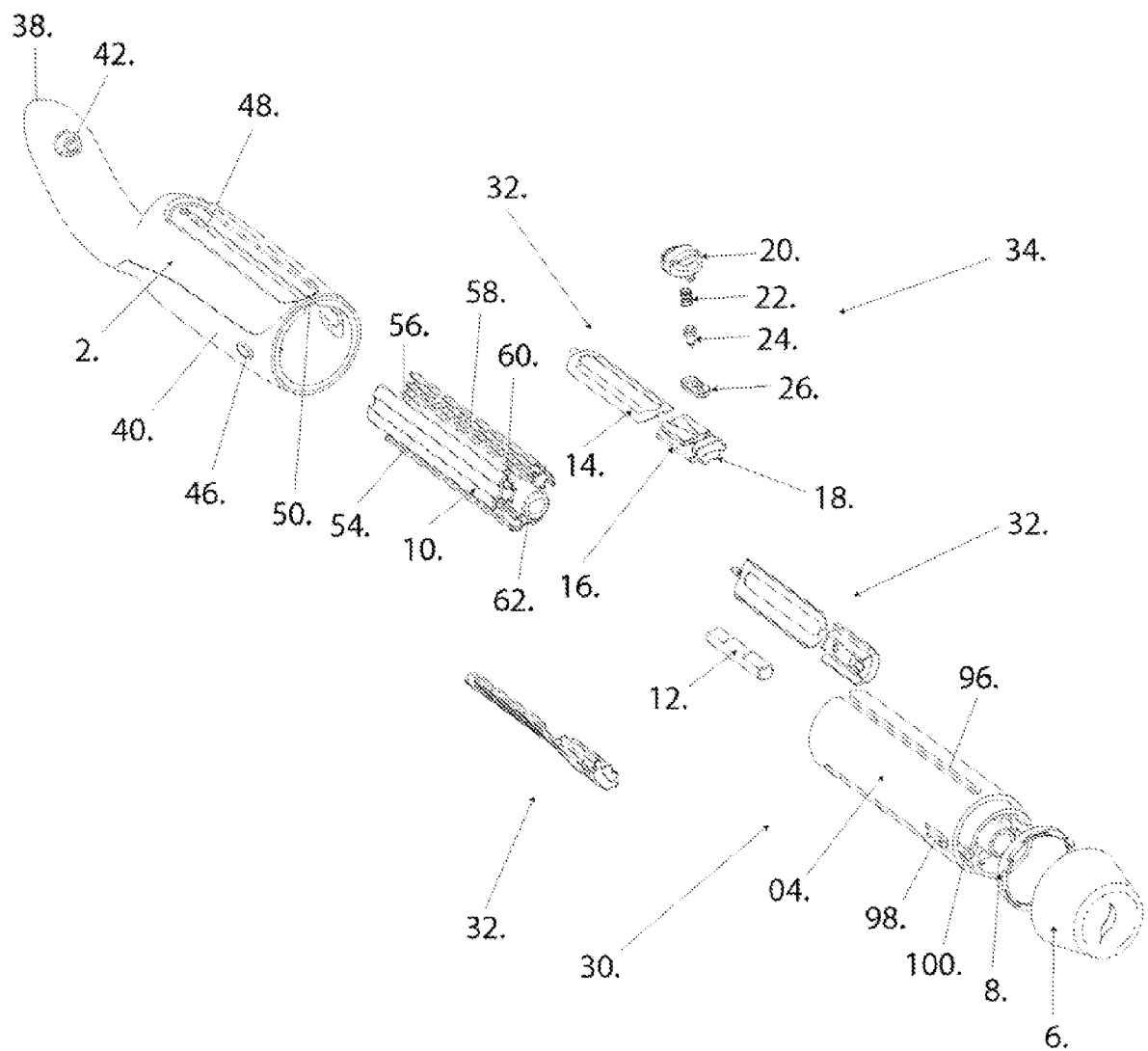
FIG. 7 is an expanded view of the handheld peeler with removable multi-blade cartridge illustrating all physical components.

Now referring to FIGS. 6 and 7, the physical components of the present invention are illustrated in an expanded view, FIG. 7, and cross sectional views, FIG. 6, which illustrate the internal mechanisms of the peeler of the present invention. As illustrated, the handheld peeler with removable multi-blade cartridge assembly 30 comprises in combination: a main handle 2 made from steel or any other suitable tough metal or plastic; button assembly 34 consisting of a top button 20, fixing plate 26, a spring loaded pin 24, and a button spring 22; a blade cartridge 10; a plurality of blades 14; for each individual blade 14: a top blade holder 16, a bottom blade holder 18, a blade securing pin 28, a blade guard 4; and a button assembly 34 to secure the blade 14 in an extended or retracted position; an axle 12; a retaining ring 8; and a knob 6.

The handheld peeler of the present invention is operated by first assembling the device by placing the blade cartridge assembly unit 30 in the handle 2, by aligning the top blade guard guide slots 96 and bottom blade guard guide slots 106 on the blade guard 4, with the rib 108 on the interior of the handle 2 cavity and pushing it into position, securing the blade cartridge unit 30 in place with the blade guard clips 98 on the blade guard 4. When the cartridge 10 is inserted into the handle 2 the spring-loaded pin 24 on the button assembly 34 slides over the sloped surface 64 of the top blade holder 16 compressing the spring and allowing the spring loaded pin 24 to lock down into the recess on the top blade holder 16.

Once the cartridge 10 is inserted the peeler is further operated by rotating the knob 6 which in turn rotates the axle 12, retaining ring 8 and blade cartridge 10, and blades to select a blade 14, and using the button 20 to extend the blade 14 through the blade opening 44 and into the cutting area until the blade 14 engages the forward blade rest 42. During blade 14 selection, as the knob 6 is rotated, a knob position detent 100 ensures that the rotation can only occur in a manner that positions the blade for extension by the button 20 and reduce the likelihood of sticking or jamming of the blade 14.

Now referring to FIGS. 1-5, the peeler's exterior is comprised of the handle 2, which has an ergonomic shape for gripping and is comprised of a rubber or textures grip area 40, and an extended forward portion that is u-shaped, providing a forward resting area for the blade 14. The graspable area of the handle 2 is covered in texture, rubber material, or like material to improve the handle's 2 grip. On the top face of the handle 2 a button 20, which travels in a button track 48, is located for retracting and extending blades 14. Internal to this button 20 are a spring, a spring loaded pin 24 which rests against this spring and a fixing plate 26. Which firmly attaches the button 20 to the main handle 2.

To extend or retract a blade 14, the knob 6 must first be rotated to a position marked with a Blade locator 52, these positions are also marked by detents on the knob 6 part which engage with fingers on the blade guard 4 to snap the knob 6 into positions for the blades 14 making it easier for the user to properly locate the correct position, next the button assembly 34 must be pushed and slid either forward, toward the forward blade rest 42 for extending a blade 14, or slide backward toward the knob 6 to retract a blade 14. The spring-loaded pin 24 on the button 20 engages the top holder of the blade 14, and it is this engagement that enables the button assembly 34 to control the location of the blade 14. When the button 20 engages one of the blade assemblies 32 causing it to move in either direction the fins at either side of the top blade holder 16 slide along the cartridge rails 58. These cartridge rails 58 provide the required support and guidance to allow the blade tip 82 to properly locate it into the forward blade rest 42 on the handle 2 or to properly return it to its stored position. To control blade 15 location and motion a forward blade locking detent 56 and rear blade locking detent 60 restrict the extension and retraction of the blades 14.

Because of the interaction between the blade holder and the spring-loaded pin 24 on the button assembly 34 it is only possible to release the cartridge 10 when the knob 6 is rotated to one of the positions marked on the knob 6 by an arrow indicator 104. The spring loaded pin 24 on the button 20 is only in line with the button release slot 54 of the cartridge 10 when the knob 6 is rotated to one of the positions marked on the knob 6 by an arrow locator and it is only in this state that the cartridge assembly 30 can be removed by pushing or applying pressure to the gripping pads 46. During the application of pressure, the knob 6 and the internal components combined as to form the cartridge assembly 30 can be separated from the handle 2, resulting in the removal of the cartridge assembly 30 as one unit.

When the blades 14 are retracted, the knob 6 may be rotated in either a clockwise or counter-clockwise direction for blade selection. Rotation of the knob 6 results in a rotation of the axle 12 in the same direction, the axle 12 is permanently attached to the blade cartridge 10 via an axle mounting area 62 on the blade cartridge 10, thus the blade cartridge 10 and axle 12 also rotate in the same direction as the knob 6. The blade guard 4 is secured to the blade assembly 32 by means of the retaining ring 8 which is permanently attached to the knob 6 and holds the blade guard 4 in the correct position while allowing the blade guard 4 to rotate freely.

Figure 8:
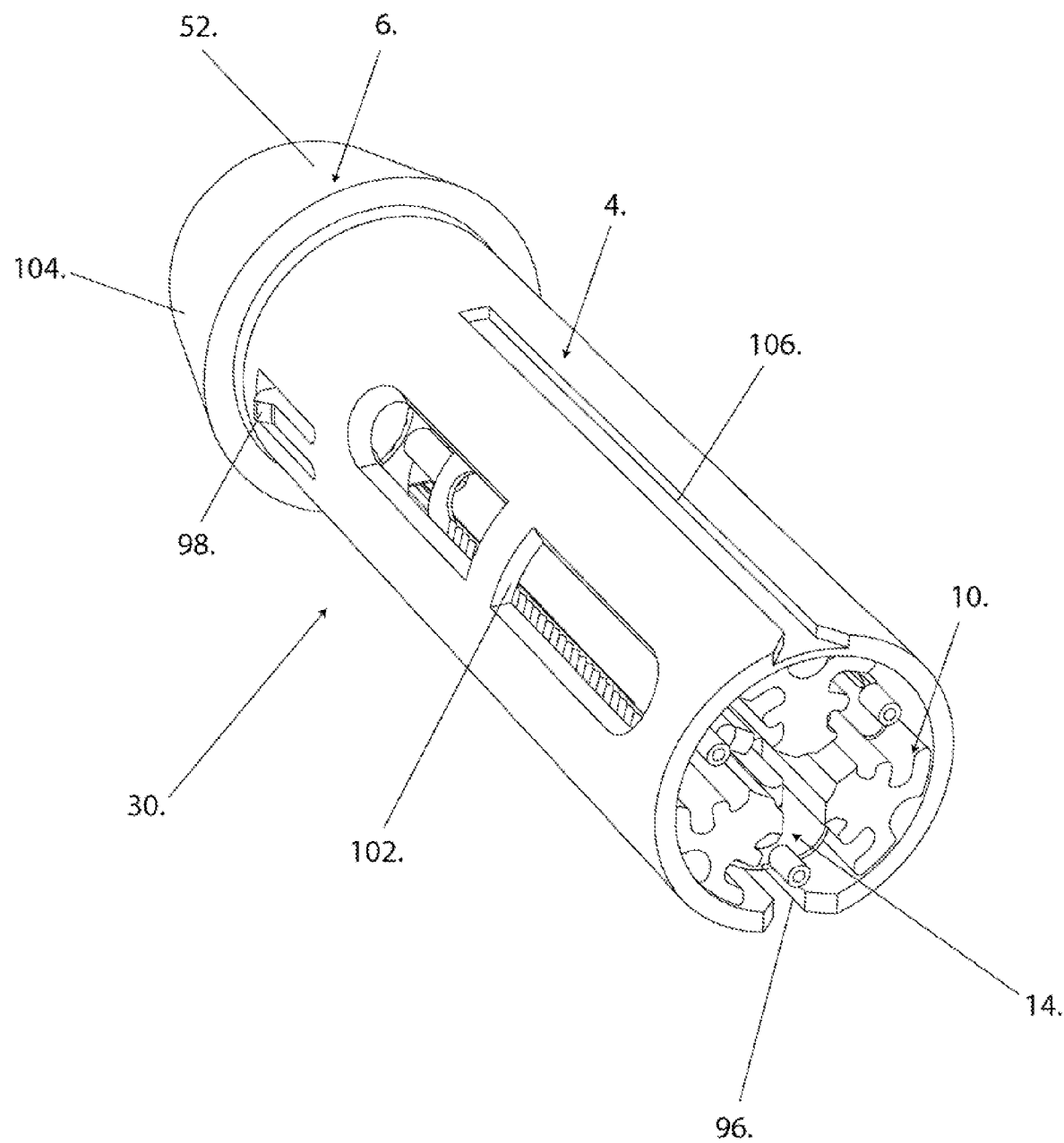
FIG. 8 illustrates the blade cartridge containing multiple blades, the retaining ring, and knob of the present invention.
Figure 13:
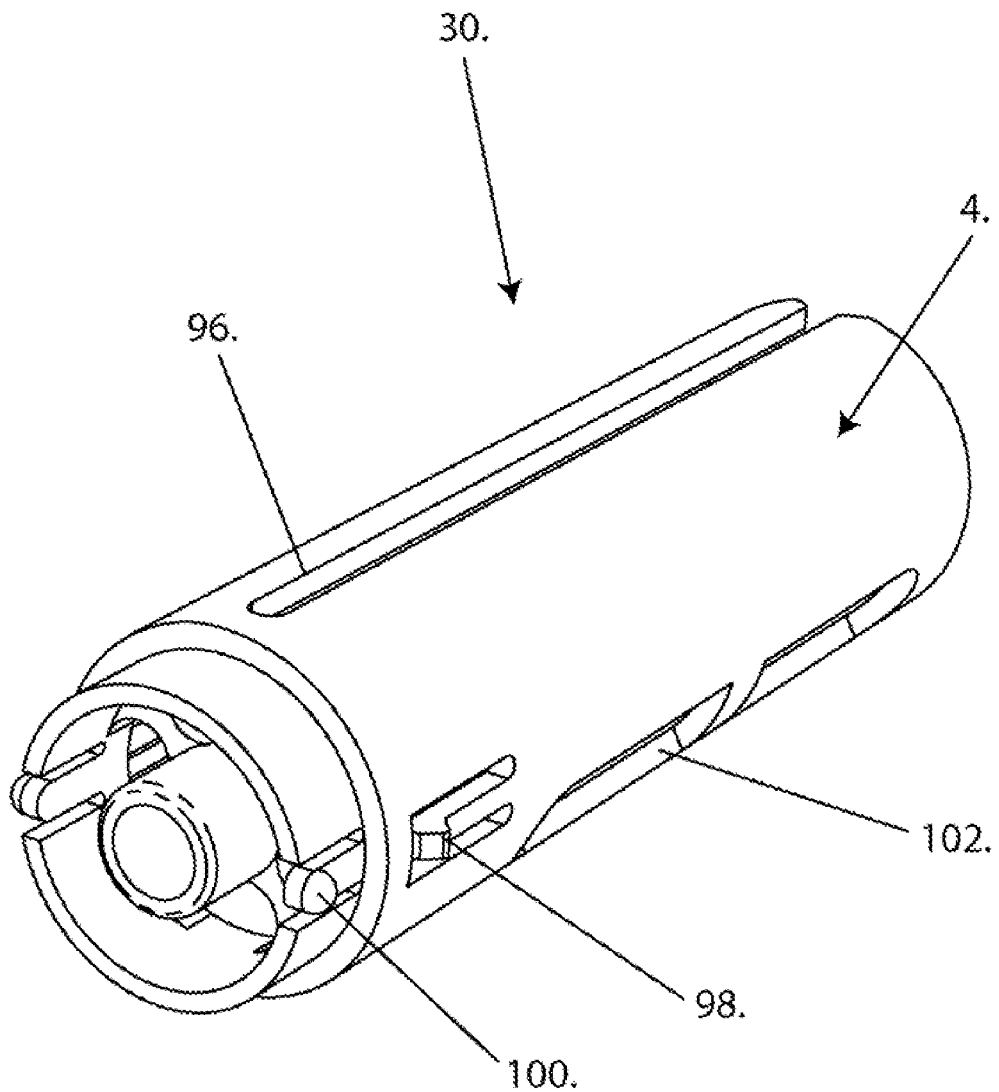
FIG. 13 illustrates the outside appearance of the blade guard part.
Figure 14:
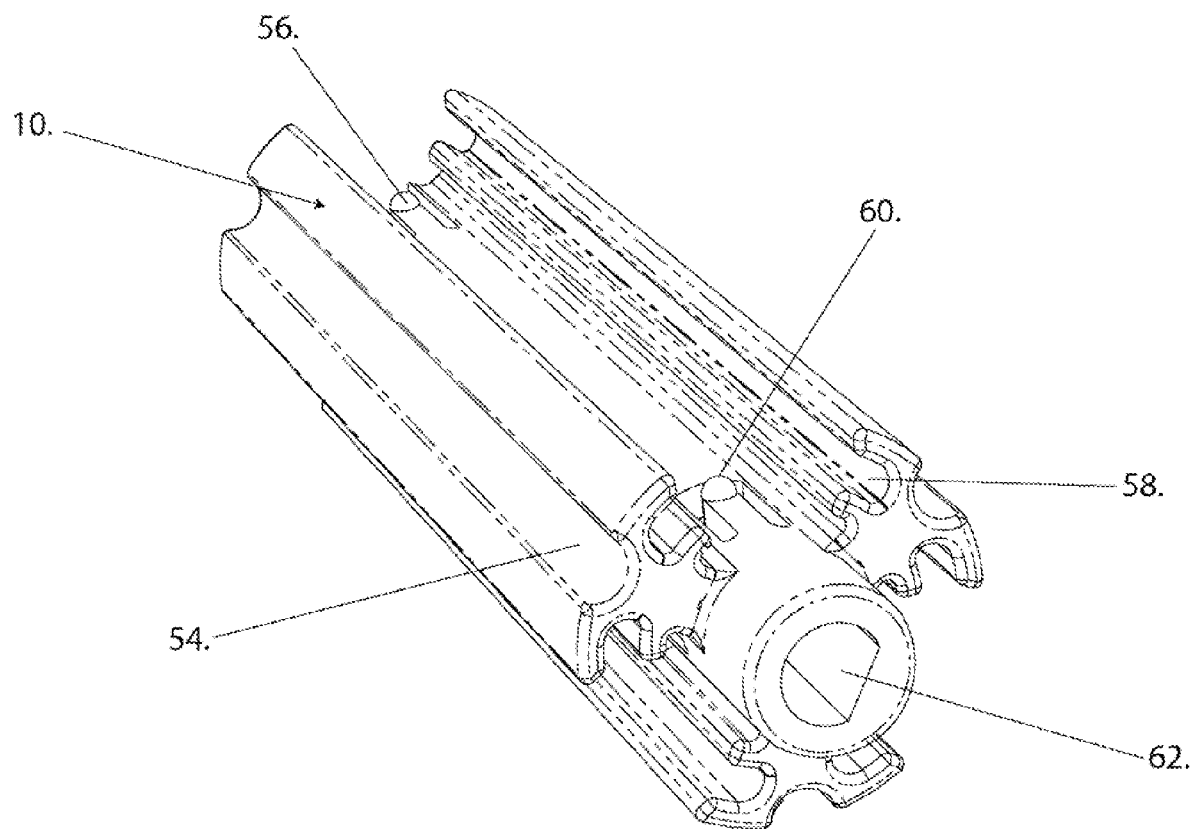
FIG. 14 illustrates the outside appearance of the cartridge part.

Now referring to FIGS. 8, 13, 14, the blade cartridge 10 is attached to the knob 6, retaining ring 8, and blade guard 4 via the axle 12 is retained within the handle 2 when the peeler is in use or storage. The blade guard 4 is free to rotate independently around the axle 12. The knob 6 is permanently affixed to the axle 12, after the blade guard 4 is slid into place on the axle 12. When the knob 6 is turned, both the axle 12 and the cartridge 10 moves with it in the same direction, while the blade guard 4 is free to rotate independently in either direction. This four-part piece is removed as one attached piece from the handle 2 after pressure is applied to the rear sides of the handle 2 near the rear gripping pads 46.

Figure 9:
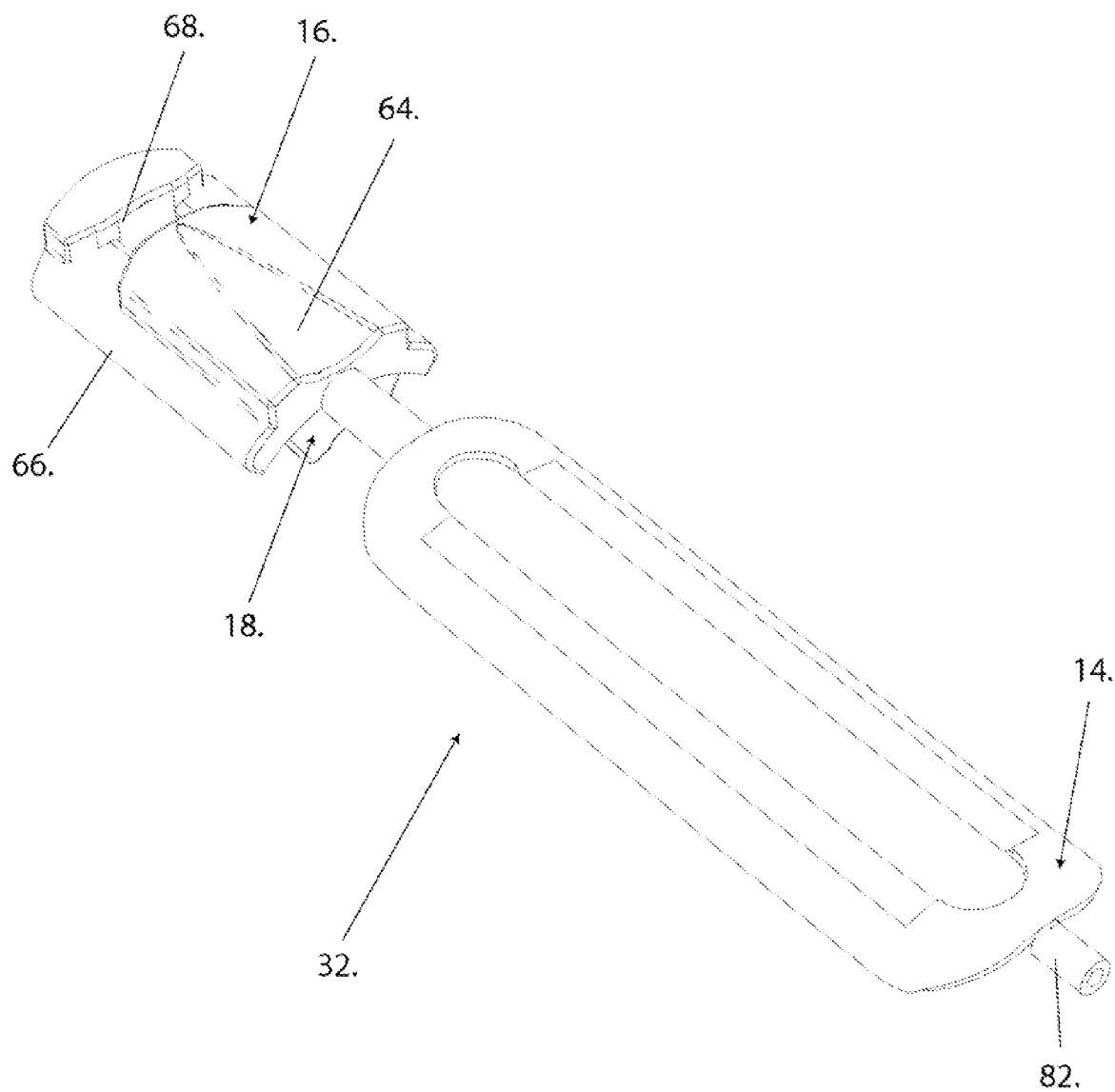
FIG. 9 is a perspective view of an assembled peeling blade and attachment means of the present invention.
Figure 10:
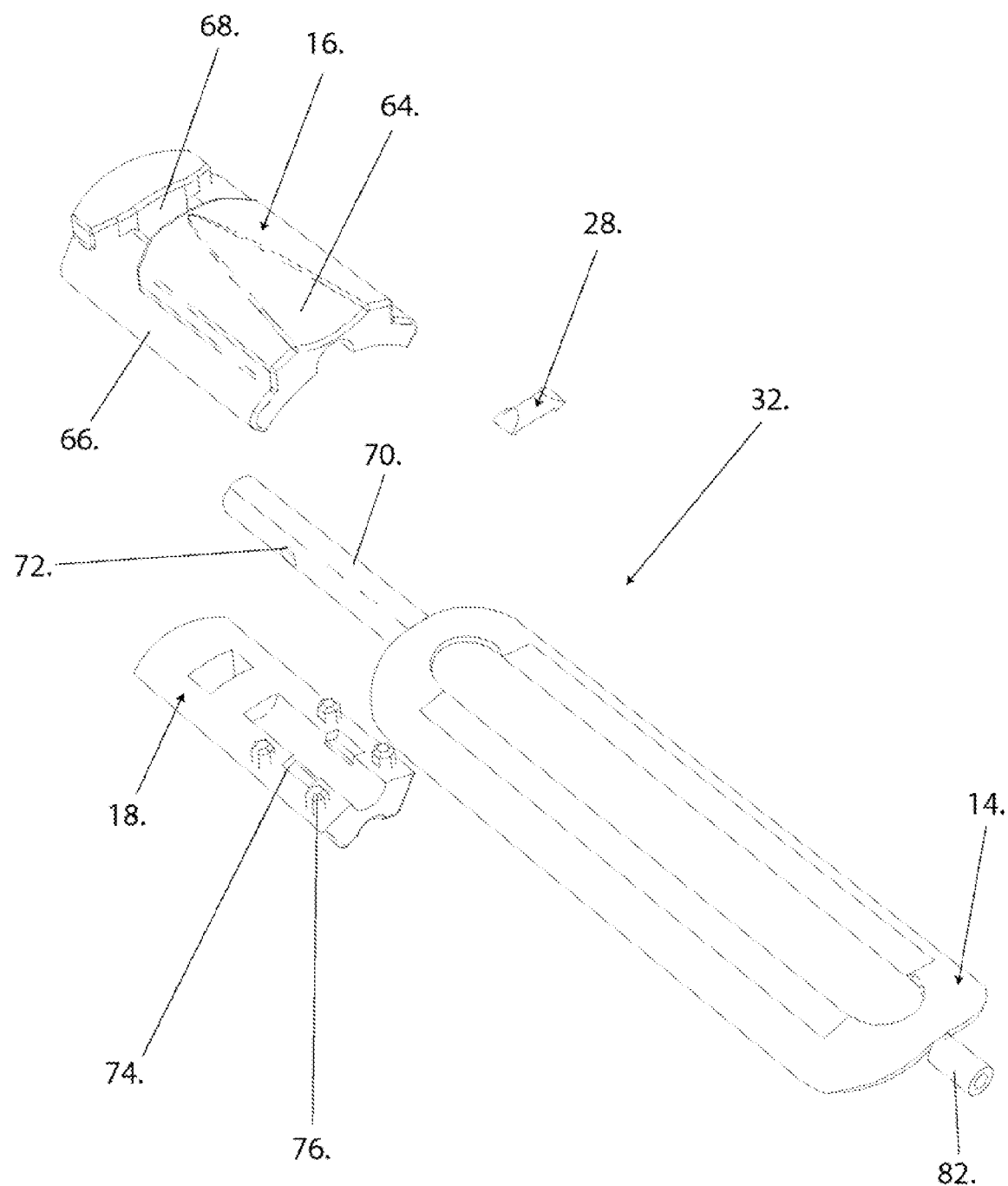
FIGS. 10 and 11 are expanded views of a typical blade, top holder, bottom holder, and metal spring.
Figure 11:
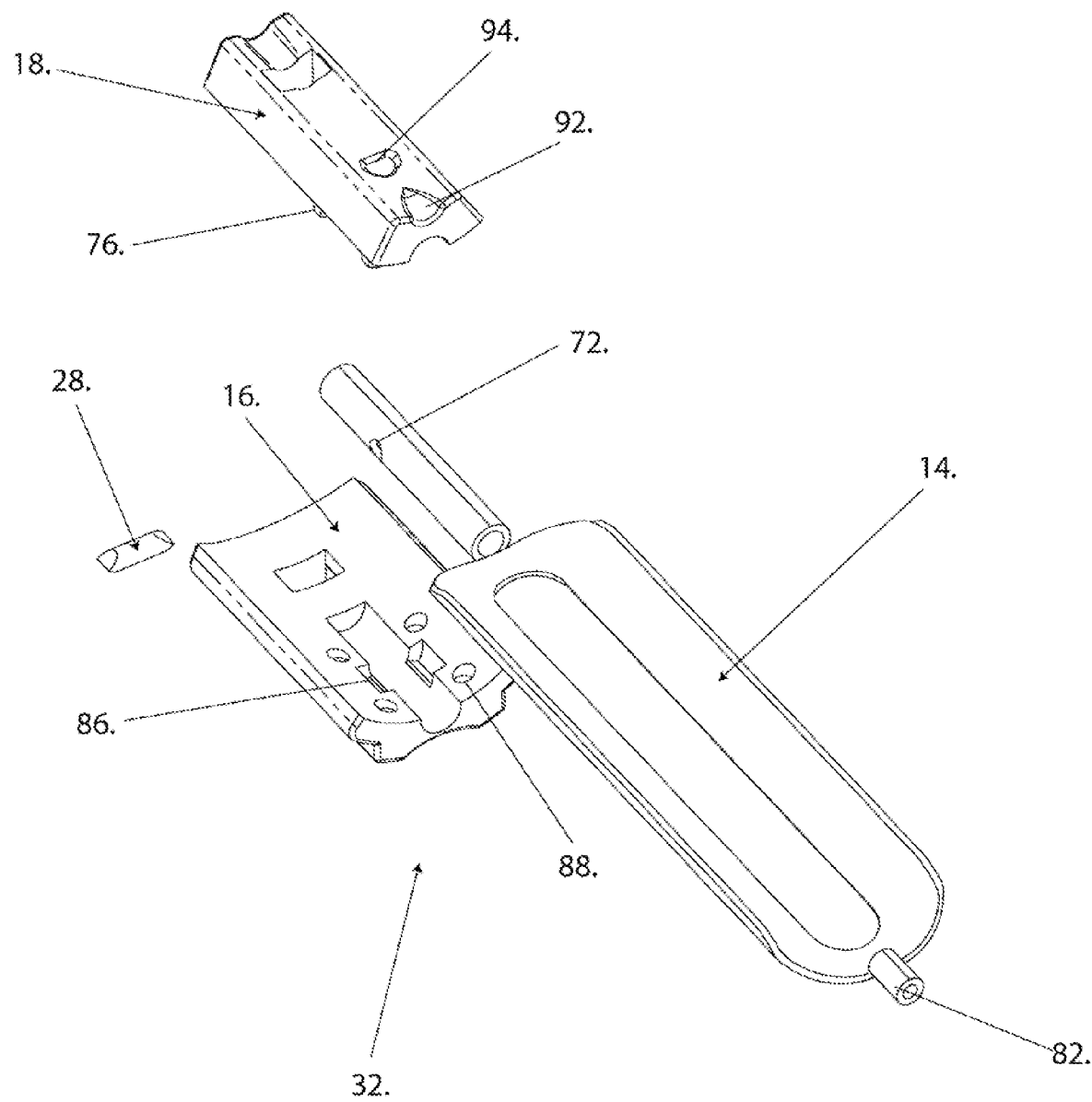

Referring to FIGS. 9, 10, & 11, the individual blades 14 and their retaining components for attachment to the blade cartridge 10 are illustrated. A blade 14 is fitted at a rear section 70 with a top blade holder 16 which consists of a top blade holding fin 66, sloped surface, and pin recess 68, blade securing pin 28, and a bottom blade holder mount 76. The top blade holder 16 and bottom blade holder 18 are secured together around the blade 14 via a blade securing pin 28 inserted into a blade securing pin hole 72 on the rear section of the blade 70 and between the top blade pivot 86 and tope blade mount 88 of the top blade holder 16 and the bottom blade pivot 74 and bottom blade holder mount 76 of the bottom holder 18. This arrangement allows the blade 14 to rotate axially around its round rear section, while preventing it from being disassembled from the blade holders. Once the top blade holder 16 and bottom blade holder 18 are attached to the blade 14, the blade assembly 32 is then placed in the blade cartridge 10 and is secured in place by a small spring finger molded into the cartridge 10 which interacts with a deboss on the bottom blade holder 18 to create a detent. It is this detent that holds the blades 14 in place when the cartridge 10 is removed, but it is weak enough to allow the blade 14 to easily be slid out when the peeler is assembled and the button 20 is pushed.

Figure 12:
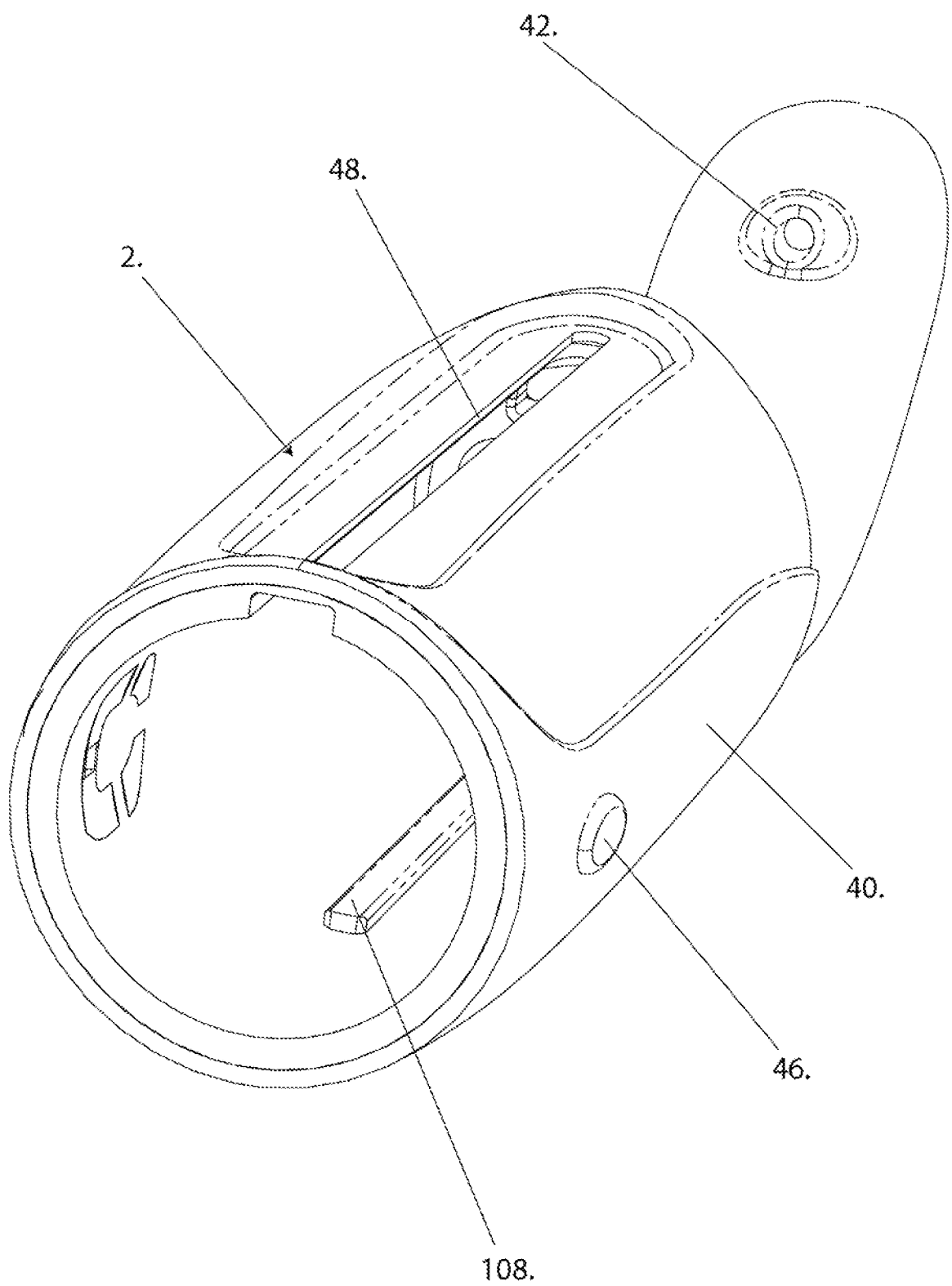
FIG. 12 illustrates the outside and inside appearance of the main handle part.

Referring to FIGS. 12, 13, and 14, the cartridge 10 interacts with the blade holder detent lead in 92 and blade holder detent 94 to secure the blade 14 in an extended or retracted position. When the button 20 is moved along its track, the spring finger flexes down disengaging it from the blade holder detent 94 and allowing the blade assembly 32 to slide forward into an extended position or backward into a retracted position.

Referring to FIGS. 1-6 the handle tip is tapered and otherwise shaped as an eyeing tip 38 to act as an eye remover to remove undesirable or spoiled areas or fruits and vegetables.

Referring to FIG. 13 the blade guard 4 has a series of perforations around its diameter. These water escape openings 102 ensure that when the cartridge 10 is washed water is able to flow out of the cartridge 10. They further made the blades 14 accessible for washing without having to remove the blades 14.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

In a preferred embodiment, the peeler of the present invention is comprised of a cartridge 10 that preferable holds three blades, but any plurality of blades could be used depending on size. The knob 6 of the preferred device has a plurality of blade locators 52 each which consist of a graphical, word, or combination design element to identify the type, size, and/or shape of a the corresponding blade along with a detent internal to the knob 6 which reinforces the correct knob 6 positioning. It is not desirable that an end user or consumer of the product handle 2 individual blade removal from the cartridge 10, rather it is anticipated that multiple cartridges such as decorative cartridges and multi-size julienne cartridges would be produced and become interchangeable with the handle 2 of the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A handheld peeler comprising in combination:
    a main handle,
    a blade guard;
    a button assembly attached to one end of the main handle;
        said button assembly further consisting of:
            a top button,
            a fixing plate,
            a spring-loaded pin, and
            a spring;
    a blade holder and affixed axle placed with in the main handle;
    aligning top blade guard guide slots and bottom blade guard guide slots located on the blade guard, with a rib on the interior of a main handle cavity and pushing the blade guard into position;
    a plurality of blades;
    when the blade holder is inserted into the main handle, the spring-loaded pin on the button assembly slides over a sloped surface on the top blade holder compressing the spring and allowing the spring loaded pin to lock down into the recess on the top blade holder;
    a retaining ring which can freely rotate around said axle securing the blade holder in place with blade guard clips on the blade guard;
    a knob affixed to said axle,
        said knob comprised of a plurality of locating arrows and a plurality of locating blade symbols;

once the blade holder is inserted, the peeler is further operated by rotating the knob, which in turn rotates the axle, retaining ring, blade holder, and blades to select a blade;

the button is used to extend the blade through a blade opening and into the cutting area until the blade engages a forward blade rest, wherein the entire blade is substantially located between the blade opening and a tip of the handle;

when extended, said blades rotate axially when deployed to follow the contour of the item being peeled and then be moved back to a stationary and centered position for storage; and during blade selection, as the knob is rotated, a knob position detent ensures that the rotation can only occur in a manner that positions the blade for extension by the button.

2. The handheld peeler of claim 1 further comprising for each blade:
   a blade securing pin;
   a top blade holder, and
   a bottom blade holder,
   wherein said bottom blade holder and the blade cartridge engage and disengage a spring finger to lock the blades in either an extended or retracted position.

3. The handheld peeler of claim 1 wherein the blade holder is removable from the handle.

4. The handheld peeler of claim 1 wherein the handle
   has an ergonomic shape;
   a graspable area with texture; and
   an extended forward portion that is u-shaped, providing a forward resting area for the blades.

5. The handheld peeler of claim 3 wherein the blade holder is released when
   the knob is rotated to one of the release positions marked on the knob by an arrow indicator;
   the spring loaded pin on the button is in line with a slot on the blade holder;
   applying pressure to the gripping pads; and
   during the application of pressure, the knob and the internal components combined as to form the blade holder assembly, resulting in the removal of the blade holder assembly as one unit.

6. The handheld peeler of claim 3 wherein when the blades are retracted, the knob may be rotated in either a clockwise or counter-clockwise direction for blade selection.

7. The handheld peeler of claim 3 wherein the blade guard is secured to the blade assembly by means of a retaining ring which is permanently attached to the knob and holds the blade guard in the correct position while allowing the blade guard to rotate freely about the axle.

8. The handheld peeler of claim 3 wherein the blade blade holder is comprised of
   a blade holder consisting of a small spring finger; and
   a plurality of blade assemblies further consisting of
      a blade;
      a top blade holder; and
      a bottom blade holder with an attached deboss;
         said top blade holder and bottom blade holders are secured together around the blade;
         said blade assemblies are secured to a blade holder by the small spring finger of said blade holder which interacts with the deboss on the bottom blade holder to create a detent; and
      said detent provides the securing means for the blade assemblies the blade holder.

9. The handheld peeler of claim 1 wherein said handle is further comprise of a tip which is tapered to act as an eye remover to remove undesirable or spoiled areas or fruits and vegetables.

10. The handheld peeler of claim 1 wherein the blade guard is further comprised of a plurality of perforations around its diameter.

* * * * *